United States Patent
Safir et al.

(10) Patent No.: US 11,214,236 B2
(45) Date of Patent: Jan. 4, 2022

(54) METHODS AND SYSTEMS FOR VEHICLE PROTECTION

(71) Applicant: Ford Global Technologies, LLC, Dearborn, MI (US)

(72) Inventors: Tarik Safir, Hornchurch (GB); Gabriel Mitchell, London (GB); Sam Harris, Billericay (GB); James Nicholas Murray, Chelmsford (GB); Aaron Abentheuer, London (GB); Betsy Fields Smith, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 16/780,395

(22) Filed: Feb. 3, 2020

(65) Prior Publication Data

US 2020/0247365 A1 Aug. 6, 2020

(30) Foreign Application Priority Data

Feb. 5, 2019 (GB) ...................................... 1901565

(51) Int. Cl.
*B60R 25/31* (2013.01)
*B60R 25/102* (2013.01)
(Continued)

(52) U.S. Cl.
CPC ............ *B60R 25/31* (2013.01); *B60R 25/102* (2013.01); *B60R 25/24* (2013.01); *B60R 25/305* (2013.01);
(Continued)

(58) Field of Classification Search
CPC ...... B60R 2025/1016; B60R 2325/101; B60R 2325/205; B60R 2325/30; B60R 25/10; B60R 25/1004; B60R 25/1012; B60R 25/102; B60R 25/24; B60R 25/305; B60R 25/31; G05D 1/0011; G05D 1/0088; G05D 1/0214; G05D 1/0276; G05D 2201/0213; G08B 13/1672; G08B 13/19; G08B 21/22; G08B 25/001; G08B 25/008; G08B 25/009; G08B 25/08; G08B 25/14; G08B 29/185; G08B 3/10; G08G 1/205; H04W 4/40
See application file for complete search history.

(56) References Cited

U.S. PATENT DOCUMENTS 9,747,795 B1 * 8/2017 Espinosa .......... G08B 13/19647
10,246,097 B1 * 4/2019 Fields ............... B60W 50/0205
(Continued)

FOREIGN PATENT DOCUMENTS

| JP | 2005092727 A | 4/2005 |
|---|---|---|
| JP | 2006117121 A | 5/2006 |

(Continued)

*Primary Examiner* — Omeed Alizada
(74) *Attorney, Agent, or Firm* — Brandon Hicks; Eversheds Sutherland (US) LLP

(57) ABSTRACT

A method (500) for protection of a vehicle (100), the method comprising: receiving information from a sensor (502); comparing the information with known signatures indicative of a likely attack (504); determining whether a known signature indicative of a likely attack is present (506); and if a known signature indicative of a likely attack is present, placing at least one system of the vehicle into a heightened state of alert (508).

13 Claims, 5 Drawing Sheets

(51) Int. Cl.
*B60R 25/24* (2013.01)
*B60R 25/30* (2013.01)
*G05D 1/02* (2020.01)
*H04W 4/40* (2018.01)
*G06N 20/00* (2019.01)
*G05D 1/00* (2006.01)
*B60R 25/10* (2013.01)

(52) U.S. Cl.
CPC ......... *G05D 1/0011* (2013.01); *G05D 1/0088* (2013.01); *G05D 1/0214* (2013.01); *G05D 1/0276* (2013.01); *G06N 20/00* (2019.01); *H04W 4/40* (2018.02); *B60R 2025/1016* (2013.01); *B60R 2325/101* (2013.01); *B60R 2325/205* (2013.01); *B60R 2325/30* (2013.01); *G05D 2201/0213* (2013.01)

(56) References Cited

U.S. PATENT DOCUMENTS

| | | | |
|---|---|---|---|
| 2002/0196161 | A1* | 12/2002 | Gould ............. G08G 1/205 340/988 |
| 2004/0263323 | A1* | 12/2004 | Seike ............. B60R 25/104 340/426.1 |
| 2006/0087411 | A1 | 4/2006 | Chang |
| 2014/0129053 | A1* | 5/2014 | Kleve ............. B60R 25/24 701/2 |
| 2015/0166009 | A1 | 6/2015 | Outwater et al. |
| 2017/0080900 | A1 | 3/2017 | Huennekens et al. |
| 2018/0101998 | A1* | 4/2018 | Pierce ............. G05D 1/0274 |
| 2018/0108369 | A1 | 4/2018 | Gross |

FOREIGN PATENT DOCUMENTS

| | | |
|---|---|---|
| JP | 2008230457 A | 10/2008 |
| JP | 2012102510 A | 5/2012 |
| KR | 20160056054 A | 5/2016 |

\* cited by examiner

METHODS AND SYSTEMS FOR VEHICLE PROTECTION

CROSS-REFERENCE TO RELATED APPLICATIONS

The disclosure claims priority to and the benefit of GB application No. 1901565.0, filed Feb. 5, 2019, which is hereby incorporated by reference herein in its entirety.

FIELD

This invention relates to a method and system for protection of a vehicle and particularly although not exclusively relates to the use of a sensor which remains active when the vehicle is parked and operates in conjunction with a controller to anticipate a likely attack on the vehicle, and to initiate counter measures.

BACKGROUND

Thieves and other criminals often target vehicles with the aim of gaining entry and stealing goods from within. These vehicle attacks are performed using means of attack including forced entry with hand tools, lock picking, keyless hacking and, more recently, a technique termed 'peel and steal' in which the top of a door of a vehicle is levered or pulled outwards and downwards, or the bodywork of a vehicle is otherwise peeled open.

It is desirable that an attack on a vehicle can be prevented before the vehicle has been damaged.

STATEMENTS OF INVENTION

According to an arrangement, there is provided a method for protection of a vehicle, the method comprising:

receiving information from at least one sensor, e.g. at least one type of sensor;

comparing the information with one or more known signatures indicative of a likely attack;

determining whether a known signature indicative of a likely attack is present; and if a known signature indicative of a likely attack is present, placing at least one system of the vehicle into a heightened state of alert.

The step of placing at least one system of the vehicle into the heightened state of alert may comprise at least one of:

activating at least one further sensor, e.g. at least one further type of sensor;

sending a notification to a location remote from the vehicle; and performing one or more steps to further secure the vehicle.

The method may additionally comprise:

comparing the information with one or more known attack mode signatures;

determining whether a known attack mode signature is present; and if a known attack mode signature is present, activating an additional vehicle system and configuring it to counter an attack having the known attack mode signature.

The method may additionally comprise:

comparing the information with one or more known intruder signatures;

determining whether a known intruder signature is present; and if a known intruder signature is present, activating an additional vehicle system and configuring it to repel an intruder.

The method may further comprises at least one of:

transmitting at least one live sensor output to a remote location;

recording at least one sensor output;

performing an action to draw attention to the vehicle; and performing an action to counter the attack.

The sensor may be fitted within the vehicle, or may be fitted to the exterior of the vehicle.

The sensor may run continuously, at least whilst the vehicle is unattended. Alternatively, the sensor may be switched on at regular and/or frequent intervals whilst the vehicle is unattended, in order to conserve battery power.

Machine learning may be used to learn at least one of:

signatures indicative of a likely attack;

attack mode signatures;

intruder signatures; and signatures of authorised persons, such as regular passengers in the vehicle.

Where the vehicle is an autonomous or semi-autonomous vehicle, the method may comprise the step of the vehicle driving away from the environment. For example, the vehicle might be configured to drive away if a controller associated with the vehicle determines that at least one of the following is present:

a known signature indicative of a likely attack; and a known attack mode signature.

The vehicle may be provided with at least one of the following types of sensors: an audio sensor, a motion sensor, a radio frequency sensor, an accelerometer, a vibration sensor, a passive infrared sensor, a Bluetooth sensor and a camera.

The method may additionally comprise:

comparing the information with one or more known signatures of authorised people, determining if a known signature of an authorised person is present; and if a known signature of an authorised person is present, allowing the authorised person access to the vehicle.

The method may further comprise the step of sending to the vehicle an instruction to treat a new person not known to the vehicle as an authorised person.

The step of sending to the vehicle an instruction comprises sending a message to the vehicle from a mobile device of a vehicle user who already has authority to use the vehicle.

The method may further comprises the step of downloading onto a mobile device of the vehicle user electronic identity data of the new person, the identity data then being sent to the vehicle by the vehicle user so that the vehicle can recognise the new person by the identity data.

The identity data of the new person may be an electronic signature of their mobile device. For example, it may comprise a Bluetooth identity of the new person's smart phone.

According to another arrangement, there is provided a system configured to perform the method of any preceding claim, the system comprising:

At least one sensor configured to gather information relating to the environment of the vehicle; and a controller, configured to be in communication with the sensor.

According to another arrangement, there is provided a method of controlling a security system, the method comprising:

sending to the security system an authorised electronic identity of a new authorised user of the security system from a central server and/or a mobile device of a user who already has authority to use the security system;

recording the electronic identity of a person approaching the security system and comparing it with the authorised electronic identities stored by the security system, determining if an authorised electronic identity is present, and if so, that the person approaching is a new authorised user; and disabling the security system sufficiently to allow the new authorised user access.

The authorised electronic identity may comprise the Bluetooth signature of the new authorised user's mobile device, such as a smart phone or tablet.

The security system may be a vehicle security system.

The step of recording the electronic identity of a person approaching the security system may comprise using existing or dedicated sensors on the vehicle to read the electronic identity of the person approaching the vehicle.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF DRAWINGS

For a better understanding of the present invention, and to show how it may be carried into effect, reference will now be made by way of example to the accompanying drawings in which.

DETAILED DESCRIPTION

Figure 1:
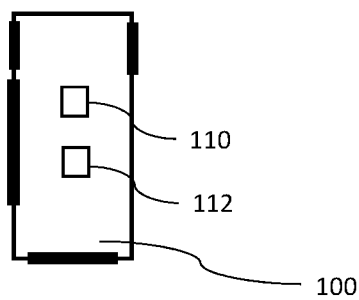
FIG. 1 is a schematic diagram of a vehicle.

For the benefit of the reader, it is useful to define a number of terms used throughout the present disclosure.

A 'known signature indicative of a likely attack' is any signature or signal associated with a potential attack on a vehicle, as detected by a sensor of the vehicle or emitted by a potential attacker, when the potential attack on the vehicle has not yet been initiated and/or the attacker is not yet engaged in the act of attacking the vehicle but may be preparing to attack. These signatures are recognisable by detection using at least one sensor of the vehicle. For example, a crowbar in the hand of a potential attacker at a distance from the vehicle may have a number of signatures, one of which may be a certain signature when reflecting radio waves, another of which may be recognised by a camera capable of object recognition.

A 'known attack mode signature' is any signature or signal associated with a mode of attacking a vehicle, as detected by a sensor of the vehicle or emitted by the attacker, when the attack has been initiated and/or the attacker is engaged in the act of attacking the vehicle. These signatures are recognisable by detection using at least one sensor of the vehicle. To continue the example of a crowbar, an accelerometer disposed within the vehicle will be able to detect the motion of the vehicle as the crowbar is wedged into a gap around a door and force applied to the lever. Similarly, audio sensors located within the vehicle or attached to the vehicle bodywork may detect the sounds associated with the crowbar being wedged into the door and the sounds of the vehicle bodywork deforming in response to the forces applied by the crowbar.

A 'known intruder signature' is any signature or signal associated with the presence of an attacker within a vehicle, as detected by a sensor of the vehicle or emitted by the attacker, when the attacker has gained access to the vehicle interior and may be engaged in the act of stealing goods therefrom. These signatures are recognisable by detection using at least one sensor of the vehicle. For example, known intruder signatures may include the detection of body heat within the vehicle when it is known that the rightful occupants of the vehicle are not present and/or access to the vehicle has been achieved by unlawful means, such as those defined by known signatures indicative of a likely attack or known attack mode signatures.

A 'known background signature' is any signature or signal associated with harmless, everyday activity within the environment of a vehicle. These signatures are recognisable by detection using at least one sensor of the vehicle. For example, known background signatures may include the sounds and vibrations caused by a nearby construction site, a rumble of thunder, the vehicle undergoing maintenance or pedestrians passing the vehicle when parked. Known background signatures do not pose a threat to the vehicle.

The known signatures defined above may be acquired by machine learning from prior-programmed knowledge and real world usage by all vehicles using the method and/or system of the present invention. For example, the known signature indicative of a likely attack related to an angle grinder at approximately five metres from a vehicle can be pre-programmed into, for example, a controller. If any vehicles using the method and/or system of the present invention are attacked using an angle grinder, the controller can learn that a signature detected shortly before the attack took place was related to the angle grinder. This knowledge can be distributed to all vehicles using the method of the present invention, such that the signature of an angle grinder can be better recognised in future. Similarly, if a signature is incorrectly classified, such as classified as being innocuous, i.e. a known background signature, but an attack on the vehicle ensues, this incorrect classification can be rectified for future occurrences. This learning process is equally applicable to other forms of vehicle attack, for example, use of a crowbar or a remote hacking attack, as well as other known signatures. In this way, the collective knowledge and accuracy of known signatures increases with use of the method and/or system, and new technologies or methods used by attackers are quickly acquired.

FIG. 1 shows a vehicle 100, comprising a controller 112 and a plurality of sensors 110. The controller 112 and sensors 110 may be connected wirelessly or with conventional wired connections. In FIG. 1, the sensors 110 are shown to be fixed within the vehicle interior, however at least one sensor 110 may be on the exterior of the vehicle attached to the vehicle body.

The sensor or sensors 110 may be of any suitable type for detecting objects and/or actions in the environment of a vehicle. The sensors 110 may be dedicated sensors or may perform additional functions such as parking assist. The sensors 110 may comprise sensors of any suitable type, such as an accelerometer, vibration sensor, motion sensor, temperature sensors, door lock sensors, tilt sensors, microphone, audio sensors, wireless signal detectors, GPS devices, cameras having hardware and software to perform facial or object recognition, Lidar, Radar, ANPR, radio frequency detectors, Bluetooth detectors, gyroscopes, passive infrared (PIR), detectors to determine the identity of a mobile device (i.e. mobile phone), or any combination thereof. A plurality of different types of sensor 110 may be provided on the vehicle, and some or all of them may be used in the method and system for vehicle protection.

In use, when the vehicle 100 is unattended, for example when parked, at least one sensor may be configured to run continuously. This sensor may be, for example, a PIR sensor configured to detect motion within the environment of the vehicle. Alternatively, this sensor may be a temperature sensor configured to detect the presence of body heat or the heat of an engine, or further still a wireless signal detector configured to detect the presence of a remote hacking attack on the locking system of vehicle doors.

Figure 5A:
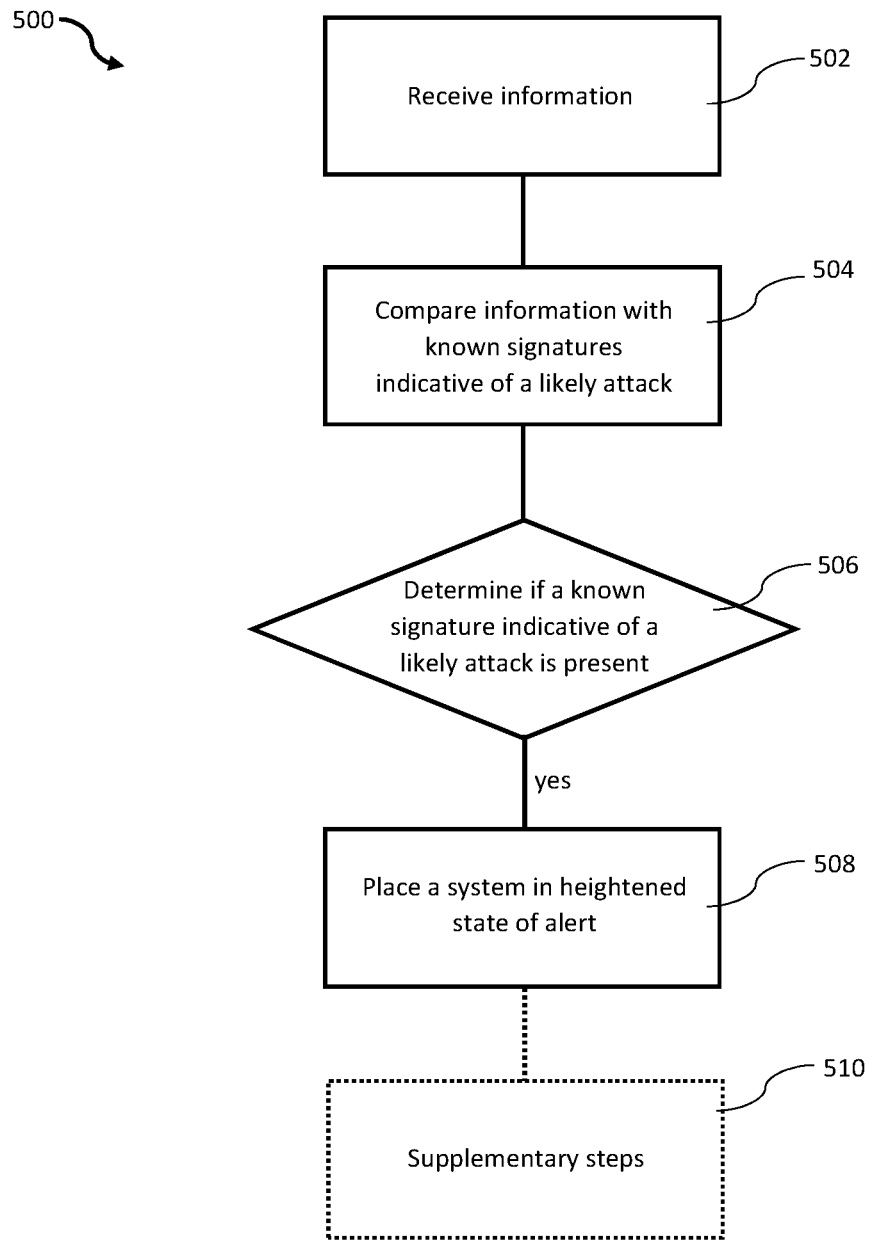
FIGS. 5a to 5c are flow charts representing a method of the present invention.
Figure 5B:
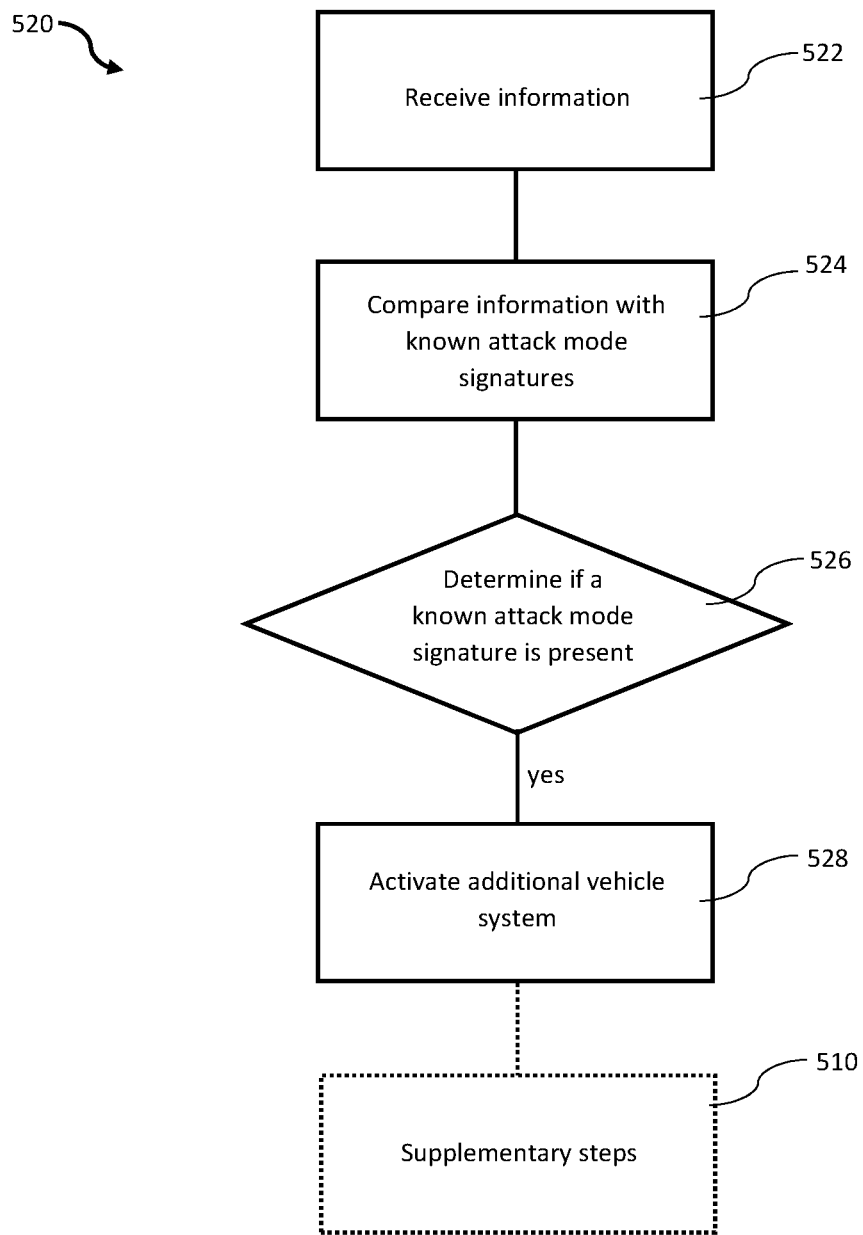
Figure 5C:
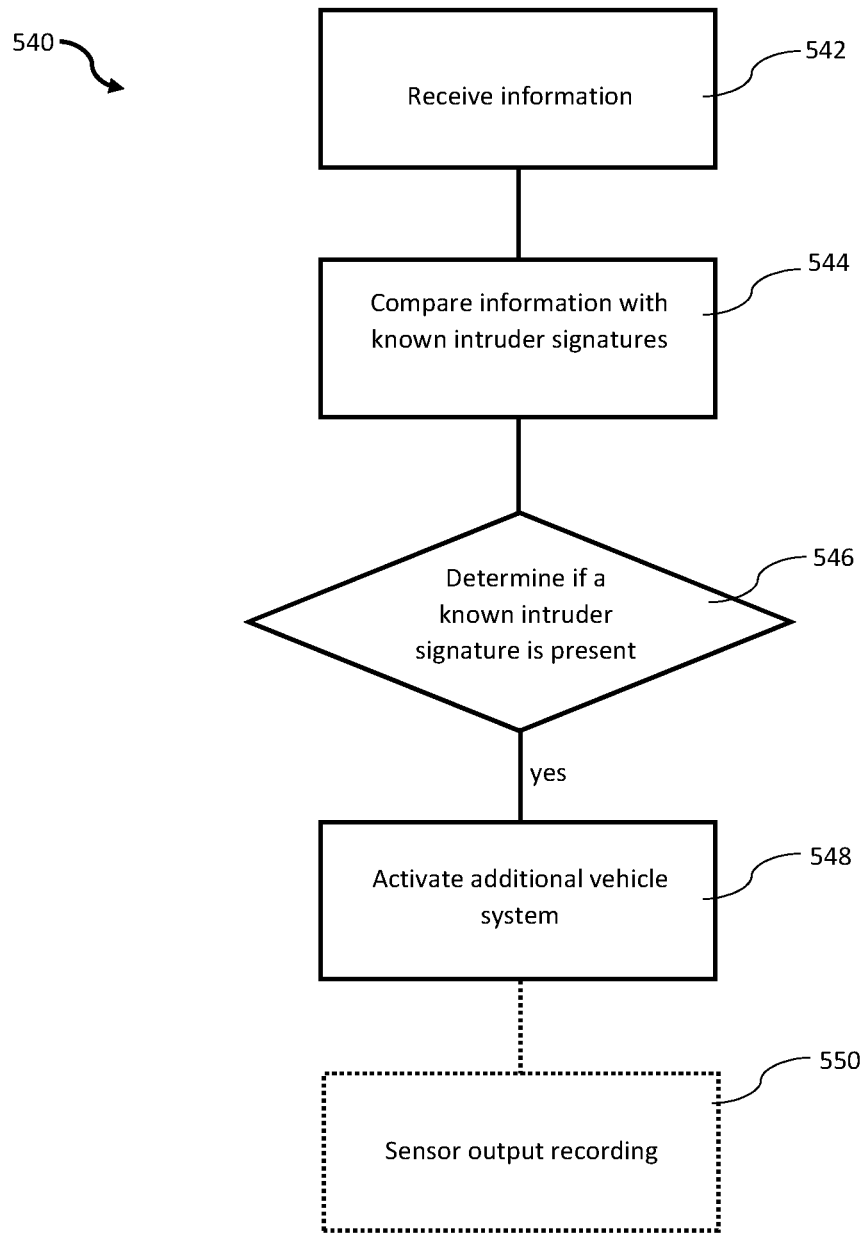

With reference to FIGS. 5a-c, the method 500, 520, 540 of the present invention will be described. At step 502, the information gathered by the at least one continuously running sensor is received by a controller 112 housed within the vehicle 100. At step 504 the controller 112 compares the information from the at least one continuously running sensor with known signatures indicative of a likely attack.

Figure 2:
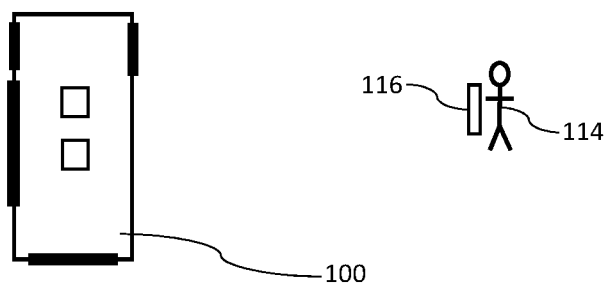
FIG. 2 is a schematic diagram of a person in the environment of a vehicle.

FIG. 2 demonstrates an exemplary scenario in which a person 114 is present within the environment of the vehicle 100. Also present is object 116, which may, for example, comprise a crowbar or pry bar. The person 114 may be in possession of object 116. The at least one continually running sensor gathers information relating to the environment of the vehicle, including person 114 and object 116.

The information gathered by the at least one continuously running sensor is received at step 502 by the controller 112. At step 504, the controller 112 compares the information with known signatures indicative of a likely attack, and determines at step 506 whether a known signature indicative of a likely attack is present. The controller 112 may additionally compare the information with known background signatures in order to eliminate any innocuous signatures gathered by the at least one sensor. In the case of FIG. 2, the presence of a person 114 in possession of an object 116 which has previously been deemed to be capable of effecting entry into the vehicle 100, is determined at step 526 by the controller 112 to be a known signature indicative of a likely attack. Consequently, at step 508, the controller 112 places at least one system of the vehicle 100 into a heightened state of alert.

The placing of the at least one system into a heightened state of alert at step 508 may include: activating at least one further sensor, such as a camera, accelerometer, vibration detector or any other sensor or combination of sensors from the lists above; sending a notification to a location remote from the vehicle; and/or performing steps to further secure the vehicle. The latter may comprise activating any deadlocks if present, cutting fuel supply to the engine or applying additional wheel brakes.

As shown in FIG. 5a, having placed at least one system of the vehicle 100 into a heightened state of alert, the controller 112 may additionally take a number of supplementary steps 510. These steps 510 may include sending a notification to a location remote from the vehicle 100, such as at least one of the mobile phone of the vehicle owner, a local law enforcement organisation, private security company and fleet manager of the vehicle 100. This notification may comprise at least one live sensor output, such as a camera, or a status indication that the vehicle has detected a known signature indicative of a likely attack, including the suspected attack method. Additionally, these supplementary steps 510 may include performing an action to demonstrate to the potential attacker that the vehicle 100 is aware of their actions. This action could be, for example, switching on and/or flashing the vehicle interior and exterior lights, sounding the horn, or emitting a verbal warning signal from a loudspeaker. In autonomous or semi-autonomous vehicles, the vehicle 100 may drive away from the environment.

The method 500 of the present invention is therefore able to foresee that an attack is likely to take place, including the likely means of the attack, before the attack has actually begun. This gives the vehicle 100 a chance to bolster its defences against such an attack, and if the owner has been notified, gives the owner a chance to themselves determine the situation occurring within the environment of the vehicle 100, and possibly take action themselves, for example by contacting the police. There is also the added benefit that the attack may be prevented with no damage being inflicted upon the vehicle 100 or its contents.

Having placed at least one system of the vehicle 100 into a heightened state of alert at step 508, the controller 112 moves on to method step 520 (FIG. 5b). The controller 112 continues to receive information from the at least one continuously running sensor at step 522. If at least one further sensor was placed in a heightened state of alert, the controller 112 receives information from each activated sensor at step 522. For example, each sensor of the plurality of sensors 110 of the vehicle 100 may now be activated, all gathering information relating to the environment of the vehicle 100, meaning that controller 112 now receives information from each sensor of the plurality of sensors 110.

At step 524, the controller 112 compares the information it receives at step 522 from the at least one sensor with information relating to known attack mode signatures, for example, known attack mode signatures relating to the known signature indicative of a likely attack already determined by the controller 112 at step 526. These attack mode signatures may have been learnt by machine learning in a similar manner to the case of known signatures indicative of a likely attack, as described above. The controller 112 may additionally compare the information with known background signatures in order to eliminate any innocuous signatures gathered by the at least one sensor. The controller 112 then determines whether a known attack mode signature is present at step 526.

Figure 3:
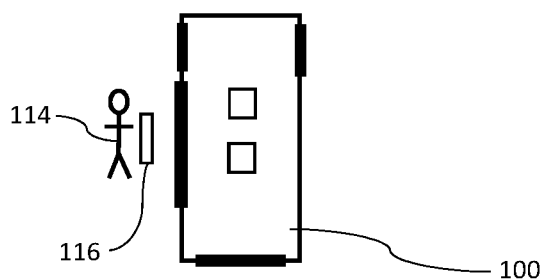
FIG. 3 is a schematic diagram of a person at a vehicle.

In the case of FIG. 3, in which the person 114 in possession of the object 116, the object 116 having been deemed a weapon capable of effecting entry into the vehicle 100, is attempting to gain entry to the vehicle 100 by means of the object 116, the information gathered by the at least one sensor and received by the controller 112 at step 522 relates to the actions taking place upon the vehicle. For example, if an angle grinder were being used by an attacker to effect entry into the interior of the vehicle 100, the vibrations of the attack mode would be detected by a vibration sensor housed in/on the vehicle 100. The information gathered by the vibration sensor would then be received by the controller 112 at step 522 for comparison with known attack mode signatures at step 524.

If the controller 112 determines that a known attack mode signature is present, the controller 112 activates an additional vehicle system at step 528 and configures it to counter the attack having the known attack mode signature. For example, if a hacking attack is detected, the controller 112 may activate a vehicle system configured to counter-hack the system used by the attacker. As another example, if the vehicle 100 is being attacked in person, such as by means of a crowbar, the controller 112 may activate strobe lights, configured to debilitate the attacker, at step 528. Having determined the presence of a known attack mode, it is now known that an attack is taking place on the vehicle 100.

At this stage, the controller 112 may additionally take a number of supplementary steps 510 as disclosed previously. These steps may include sending of a notification to a location remote from the vehicle 100, and/or an action to demonstrate that the vehicle 100 is aware of the actions of the attacker. As the vehicle has now determined that an attack is actually taking place, and not that it is just likely, the supplementary steps 510 taken by the controller 112 may be more definite in their nature. For example, the vehicle 100 may continuously sound its horn, flash its lights and emit loud verbal warnings to the attacker. The controller 112 may activate further sensors disposed within the vehicle. In autonomous or semi-autonomous vehicles, the vehicle 100 may drive away from the environment.

Figure 4:
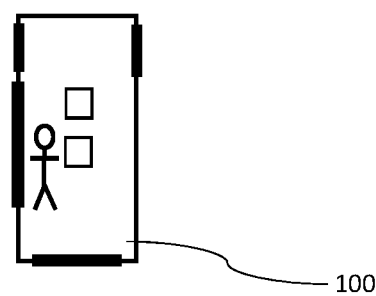
FIG. 4 is a schematic diagram of a person in a vehicle.

After determining the presence of a known attack mode, and activating an additional vehicle system at step 528, the controller 112 may move on to method step 540 (FIG. 5*c*). The controller 112 continues to receive information from the at least one sensor, comparing the information at step 544 with known intruder signatures learnt by machine learning, as described above. The controller 112 may additionally compare the information with known background signatures in order to eliminate any innocuous signatures gathered by the at least one sensor. In, for example, the scenario of FIG. 4, where a person 114 has gained unlawful access to the interior of the vehicle 100, a thermal sensor within the vehicle 100 gathers information relating to the thermal conditions of the vehicle interior. This information is received by the controller 112 at step 542, and then compared with known intruder signatures at step 544. If it is determined by the controller 112, based on the information received, that a known intruder signature is present, the controller 112 activates an additional vehicle system at step 548 to repel, scare off or deter the intruder from continuing their activities. This may take the form of a strobe light, a staining identifying fluid that can be sprayed on the intruder, or if autonomous or semi-autonomous, the vehicle 100 may begin to drive away from the environment.

At each stage of determining the presence of a known signature at steps 506, 526, 546, be it known signatures indicative of a likely attack, known attack mode signatures or known intruder signatures, the controller 112 may timeout after a certain duration of inactivity or return to a previous step. For example, if a known signature indicative of a likely attack is determined to be present at step 506, the additional vehicle system will remain in a heightened state of alert so for a certain length of time, such as five minutes. If after this length of time the method has not progressed to the next stage as no further determinations of known signatures have been made by the controller 112, then the system in a heightened state of alert will return to step 502 of method 500 in order to preserve vehicle battery life.

Once it is determined that an attack is taking place, or that an intruder is within the vehicle 100, the controller 112 may begin recording the outputs of a number of sensors at step 550 to improve the chances of apprehending the attackers. These recorded outputs may be stored on a storage device. These recorded outputs may be of any suitable type, for example relating to gait analysis, facial recognition, voice recording of speech between attackers, video recording of the vehicle, ANPR, scanning of the local environment to identify electronic devices (e.g. mobile phones and nearby vehicles) present at the time of the attack. The latter may be performed by pinging nearby devices and recording their identities, such as Bluetooth identities. As Bluetooth has a relatively low effective range, any devices being detectable by Bluetooth can be known to have been within approximately ten metres of the vehicle at the time of the attack. Similarly, vehicle attacks are often carried out using other vehicles, so any vehicles detected nearby at the time of the attack, for example using ANPR, can be identified.

At least one recorded sensor output may be sent to a device remote from the vehicle such as a law enforcement computer. The recorded sensor outputs could be correlated with other vehicle attacks to identify any attackers responsible for multiple vehicle attacks. This information could then be used by law enforcement to improve the chances of apprehending and convicting the attackers.

It is possible that the signature of an individual attacker, including their unique mannerisms and characteristics, can be learnt. This may be particularly useful if the present method were additionally used for protection outside the realm of vehicles, for example in home or shop security systems.

The method of the present disclosure is therefore a means of vehicle protection that acts pre-emptively before a vehicle attack, counteractively and proactively during a vehicle attack, and advantageously after a vehicle attack.

Figure 6:
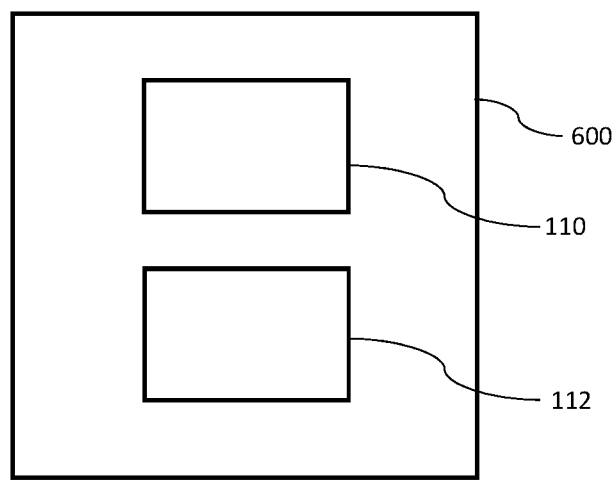
FIG. 6 is a schematic diagram of a system of the present invention.

With reference to FIG. 6, a system 600 comprises the plurality of sensors 110 configured to gather information relating to the environment of the vehicle 100, and the controller 112 configured to be in communication with the plurality of sensors 110. The system 600 may additionally comprise a strobe light, a loudspeaker, a horn and a storage device (not shown). The system 600 is configurable to carry out the method 500, 520, 540 of the present invention.

The system and method of the present invention may have additional applications beyond attack protection.

In particular vehicles, it is common that multiple people will need to access the vehicle over a period of time. Often, only the driver of a vehicle will have a set of keys, meaning in these circumstances, vehicles may be left unlocked to avoid the inconvenience of different people needing the keys to lock and unlock the vehicle.

The system and method of the present invention is able to circumvent these problems, by the use of non-contact and/or remote authorisation of a new person, not known to the vehicle. A driver may be able to remotely allow access to the vehicle, for example, whether by temporarily disabling the system using an app on a mobile device, or by unlocking at least one vehicle door. Additionally, it is possible that the van permits entry to a number of authorised people. These authorised people may become known to the system by virtue of their phone identity (e.g. the driver may record the Bluetooth signature of each authorised person's phone, or the system could learn their phone identity by virtue of having previously been present in the vehicle). Alternatively the unique characteristics and/or mannerisms of each person could be acquired by the system of the present invention, by means of the plurality of sensors 110, to create a known signature for each authorised person. Any of these signatures associated with an authorised person with permission to access the vehicle is termed a known signature of an authorised person.

In this way, when a person approaches the vehicle legitimately needing access, the person is permitted access without needing to use keys or operate an unlocking device. The ability of the system to permit access to a vehicle for people legitimately needing to gain entry is termed 'Delegate Entry'.

Delegate Entry may be particularly useful, for example, in commercial vehicles used by multiple tradesmen and tradeswomen, when loading and unloading is taking place, or when accessing equipment stored therein. When a person approaches a van carrying tools, the system and method of the present invention will recognise that the person is authorised by the driver, and that the tools do not pose a threat to the vehicle. The vehicle may then unlock at least one door of the vehicle such that access is allowed.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

That which is claimed is:

1. A method for protection of an autonomous or semi-autonomous vehicle, the method comprising:
    receiving information from at least one sensor configured to run continuously when the vehicle is unattended, wherein the at least one sensor comprises:
    a PIR sensor configured to detect motion;
    a temperature sensor configured to detect the presence of body heat or the heat of an engine; and/or
    a wireless signal detector;
    comparing the information with known signatures indicative of a likely attack;
    determining whether a known signature indicative of a likely attack is present;
    comparing the information with known attack mode signatures;
    determining whether a known attack mode signature is present;
    if a known signature indicative of a likely attack is present, placing at least one system of the vehicle into a heightened state of alert; and
    if it is determined that at least one of: a known signature indicative of a likely attack; and a known attack mode signature, is present, the vehicle is configured to drive away from the environment,
    wherein placing at least one system of the vehicle into the heightened state of alert comprises at least one of:
    activating at least one further sensor;
    sending a notification to a location remote from the vehicle; and
    performing steps to further secure the vehicle.

2. The method of claim 1, wherein the method comprises: if a known attack mode signature is present, activating an additional vehicle system and configuring it to counter an attack having the known attack mode signature.

3. The method of claim 2, wherein the method comprises: comparing the information with known intruder signatures;
    determining whether a known intruder signature is present; and
    if a known intruder signature is present, activating the additional vehicle system and configuring it to repel an intruder.

4. The method of claim 1, wherein when the at least one vehicle system is in the heightened state of alert, the method comprises at least one of:
    transmitting at least one live sensor output to a remote location;
    recording at least one sensor output;
    performing an action to draw attention to the vehicle; and
    performing an action to counter the attack.

5. The method of claim 1, wherein the at least one sensor is fixed within the vehicle.

6. The method of claim 1, wherein machine learning is used to learn at least one of:
    signatures indicative of a likely attack;
    attack mode signatures; and
    intruder signatures.

7. The method of claim 1, wherein the at least one sensor includes at least one of:
    an audio sensor, a motion sensor, a radio frequency sensor, an accelerometer, a vibration sensor, a passive infrared sensor, a Bluetooth sensor, and a camera.

8. The method of claim 1, wherein the method comprises:
    comparing the information with known signatures of authorized people;
    determining if a known signature of an authorized person is present; and
    if the known signature of the authorized person is present, allowing the authorized person access to the vehicle.

9. The method of claim 1, further comprising the step of sending to the vehicle an instruction to treat a new person not known to the vehicle as an authorized person.

10. The method of claim 9, wherein the step of sending to the vehicle an instruction comprises sending a message to the vehicle from a mobile device of a vehicle user who already has authority to use the vehicle.

11. The method of claim 10, wherein the method comprises the step of downloading onto a mobile device of the vehicle user an electronic signature of the mobile device of the new person, the signature of the mobile device then being sent to the vehicle by the vehicle user so that the vehicle can recognize the new person by the signature of their mobile device.

12. The method of claim 10, wherein the signature of the mobile device of the new person is the Bluetooth signature of their mobile device.

13. A system configured to perform the method of claim 1, the system comprising:
    a plurality of sensors configured to gather information relating to the environment of the vehicle; and
    a controller configured to be in communication with the plurality of sensors.

* * * * *